A. BALL.
Guides for Rotary Rock-Drills.
No. 134,506. Patented Jan. 7, 1873.
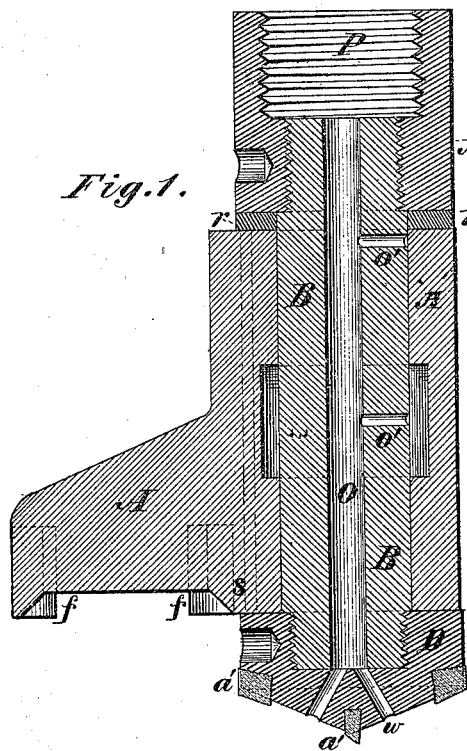
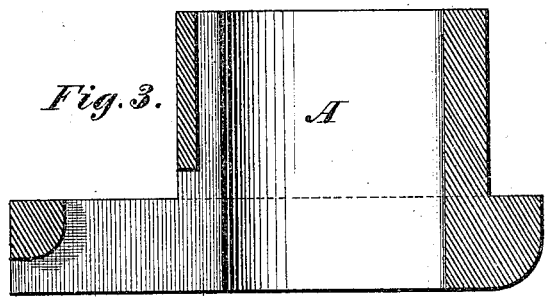
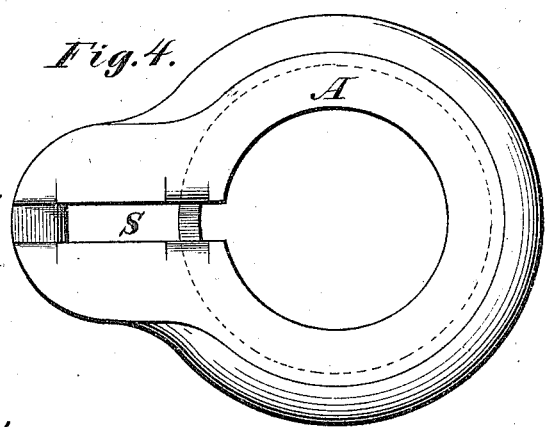
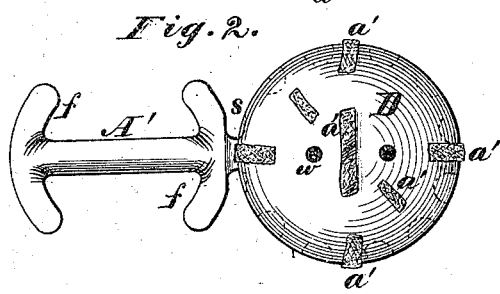
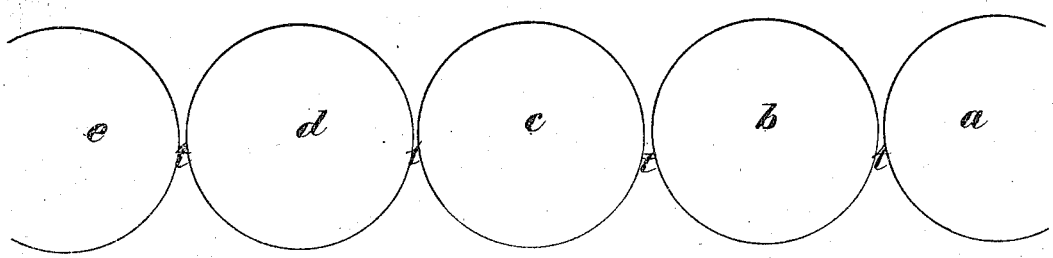
Witnesses.
R. W. Love,
W. H. Figgis.
Inventor:
Albert Ball.

UNITED STATES PATENT OFFICE.

ALBERT BALL, OF CLAREMONT, NEW HAMPSHIRE, ASSIGNOR TO SULLIVAN MACHINE COMPANY, OF SAME PLACE.

IMPROVEMENT IN GUIDES FOR ROTARY ROCK-DRILLS.

Specification forming part of Letters Patent No. 134,506, dated January 7, 1873.

*To all whom it may concern:*

Be it known that I, ALBERT BALL, of the town of Claremont, county of Sullivan and State of New Hampshire, have invented certain Improvements in Guides for Rotary Rock-Drills; and I declare the following to be a full and exact description thereof.

My invention consists, first, in a device for holding a rotating drill head or bit while at work to a direct line of operation, at a uniform distance from a hole already bored; second, in a device combined with drill and guide for cutting or breaking a narrow wall or web left between two holes while the second hole is being bored; third, in a device for holding the guide in position until its use as a guide begins.

The attempt has hitherto been made to use a drill-guide, operating within a hole already bored; but such guides have not proved of practical value, because the guide has been attached to a drill head or bit which, in boring the second hole, directly intercommunicated with or intercut the hole already bored or the guiding-hole. In such case the drill head or bit when at work is only partially employed, and is not supported on all sides by the wall of the rock or material into which it is fed, and for these reasons the bit or head will soon so tend or run toward the hole already bored as to bind and to interfere with the successful working of the drill. This tendency is wholly obviated by my improvement, and the efficiency of such drills for channel-cutting is materially increased.

In the drawing filed herewith, Figure 1 represents a vertical section of solid diamond-drill head, &c., with my improvements; Fig. 2, an end view of solid diamond-drill head with my improvements; Fig. 3, a vertical section of guide sleeve or collar; Fig. 4, end view of guide sleeve or collar; Fig. 5, a series of holes bored in rock or marble.

In the drawing the same letters represent corresponding parts of the devices referred to.

A is the guide-sleeve; B, drill-shank; O, water-way; N, coupling to attach drill-shank to drill-rod; P, drill-rod threaded to attach to coupling; $r$, friction-ring between guide-collar and coupling-nut; $o'$ $o'$, water-ways to lubricate between shank and guide collar or sleeve; $f f$, guide-flanges; $s$, cutter to break or cut out web of stone or marble; $A'$, metallic web to support guide-flanges $f f$; S, slot to receive the braced web of guide-flanges, and to hold the same in position until the guide-flanges enter the guiding-hole; $a'$ $a'$, diamond or other cutting or attriting surfaces; $w$ $w$, water-ways through drill head or bit.

My devices may be attached to any of the well-known rotating drills where it is desired to drill a hole near to a hole already bored, or to make a channel cut to best advantage by boring a series of holes. For example, we will suppose that the hole $e$, in Fig. 5, has already been bored, as there indicated, without the use of the guide. The drill should now be adjusted for boring the hole $d$, so as to leave a wall or web between the holes $e$ and $d$. The guide is not necessary in beginning to bore the hole $d$, and the guide collar or sleeve A is adjusted to hold the guide-flanges $f f$ in position, so that they shall be fed into the hole $e$ when the drill-head has made a little progress into the material to be bored. The flanges $f f$ are now fed forward into $e$, leaving the guide sleeve or collar A at the surface of the rock. The cutter S is fed downward with the guide-flanges $f f$, and breaks down the narrow web or wall between $d$ and $e$, above the drill-head, when the wall or web has ceased to be of use in supporting or guiding the drill-head. It is obvious that the guide-flange more remote from the drill-head will aid the wall of the hole $d$ in resisting any tendency of the drill-head to run toward the hole $e$, and that the guide-flange nearer to the drill-head resists any tendency of the drill-head to run from the hole $e$, and that in boring each hole full work is obtained from the drill-head.

I prefer to make the flanges $f f$ and the connecting-web A as they appear in the drawing, to obviate unnecessary friction, and to leave ample space for the removal of the dust and *detritus* produced by working the drill. The length of the cutter S must vary as the material to be bored varies in hardness or softness, or in fineness or coarseness, of grain.

What I claim as my invention, and desire to secure by Letters Patent, is—

1. The combination of the cutter S with a rotary drill bit or head and a drill-guide, substantially as described, and for the purpose set forth.

2. The combination of the flanges $f\ f$, the web $A'$, and a drill head or bit, substantially as described, and for the purposes set forth.

3. The guide sleeve or collar A, in combination with the drill-guide and drill-head, substantially as described.

ALBERT BALL.

Witnesses:
  R. W. LOVE,
  W. H. FIGGIS.